(12) United States Patent
Han

(10) Patent No.: US 11,669,781 B2
(45) Date of Patent: Jun. 6, 2023

(54) ARTIFICIAL INTELLIGENCE SERVER AND METHOD FOR UPDATING ARTIFICIAL INTELLIGENCE MODEL BY MERGING PLURALITY OF PIECES OF UPDATE INFORMATION

(71) Applicant: LG ELECTRONICS INC., Seoul (KR)

(72) Inventor: Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 549 days.

(21) Appl. No.: 16/810,617

(22) Filed: Mar. 5, 2020

(65) Prior Publication Data

US 2021/0182740 A1 Jun. 17, 2021

(30) Foreign Application Priority Data

Dec. 17, 2019 (KR) ........................ 10-2019-0169162

(51) Int. Cl.
*G06N 20/20* (2019.01)
*G06N 3/08* (2023.01)
*G06N 5/04* (2023.01)
*G06F 17/18* (2006.01)
*H04L 29/08* (2006.01)
*H04L 67/10* (2022.01)

(52) U.S. Cl.
CPC ............. *G06N 20/20* (2019.01); *G06F 17/18* (2013.01); *G06N 3/08* (2013.01); *G06N 5/04* (2013.01); *H04L 67/10* (2013.01)

(58) Field of Classification Search
CPC ............ G06N 20/20; G06N 3/08; G06N 5/04; G06N 3/0454; G06F 17/18; H04L 67/10
See application file for complete search history.

(56) References Cited

U.S. PATENT DOCUMENTS

| | | | |
|---|---|---|---|
| 10,380,500 B2* | 8/2019 | Miao | G06F 8/65 |
| 11,080,616 B2* | 8/2021 | Zeiler | G06F 3/048 |
| 2013/0044593 A1* | 2/2013 | Wong | H04L 1/1829 370/229 |
| 2020/0160207 A1* | 5/2020 | Song | G06F 11/3466 |
| 2020/0349390 A1* | 11/2020 | Konwar | G06V 20/20 |
| 2021/0150330 A1* | 5/2021 | Sharma | G06N 3/0454 |

\* cited by examiner

*Primary Examiner* — Abdullahi E Salad
(74) *Attorney, Agent, or Firm* — Lee, Hong, Degerman, Kang & Waimey PC

(57) ABSTRACT

Disclosed herein is an artificial intelligence server for updating an artificial intelligence model by merging a plurality of pieces of update information including a memory configured to store a first artificial intelligence model, a communication modem configured to communicate with a plurality of artificial intelligence apparatuses, and a processor configured to transmit the first artificial intelligence model to the plurality of artificial intelligence apparatuses, receive, from at least one of the plurality of artificial intelligence apparatuses, first update information of the first artificial intelligence model or second update information of a second artificial intelligence model updated from the first artificial intelligence model, select third update information to be used to update the first artificial intelligence model from the first update information and the second update information, and update the first artificial intelligence model using the third update information.

18 Claims, 15 Drawing Sheets

FIG. 9
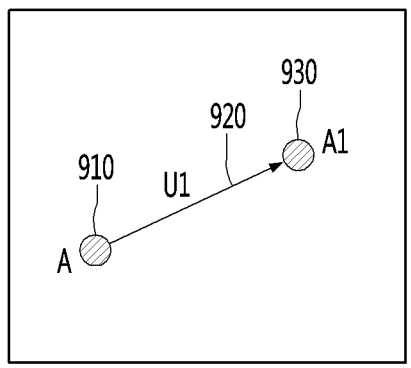
(a)
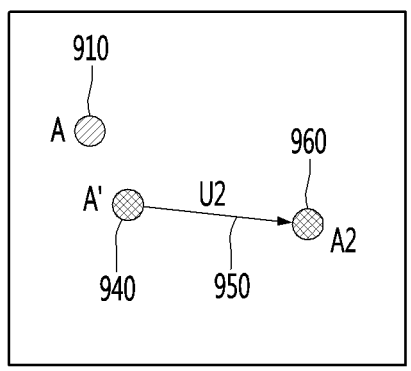
(b)
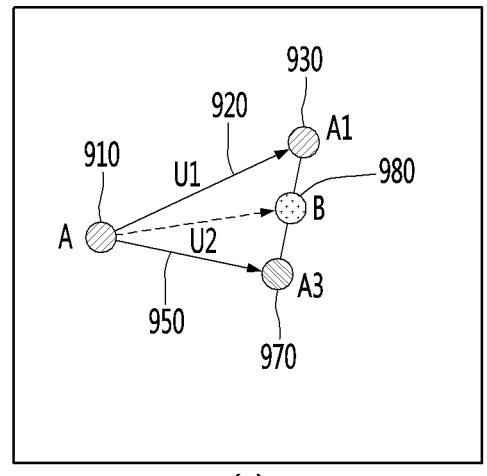
(c)

FIG. 12

| | Update information | Update baseline | Model parameter 1 | Model parameter 2 | Model parameter 3 | Model parameter 4 | Outlier |
|---|---|---|---|---|---|---|---|
| 1211 | Update information U1 | Artificial intelligence model A | +0.0312 | +0.0245 | -0.1531 | +0.0002 | X |
| 1212 | Update information U2 | Artificial intelligence model A | +0.0254 | +0.0339 | -0.1210 | -0.0110 | X |
| 1213 | Update information U3 | Artificial intelligence model A' | +0.0152 | +0.0294 | -0.1151 | +0.0127 | X |
| 1214 | Update information U4 | Artificial intelligence model A' | -0.1094 | +0.1512 | +0.0651 | -0.0564 | O |
| 1215 | Update information U5 | Artificial intelligence model A'' | +0.2521 | -0.0842 | -0.1421 | +0.1462 | O |

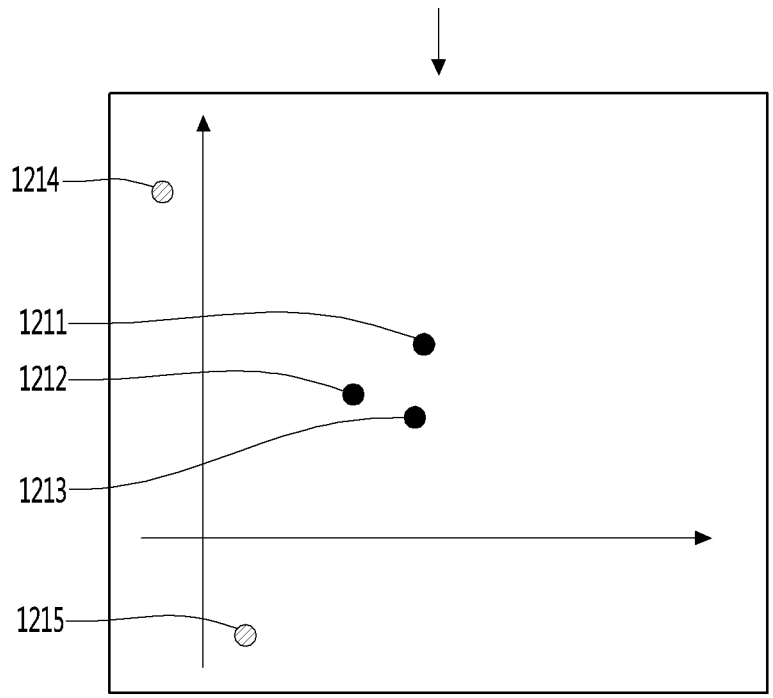

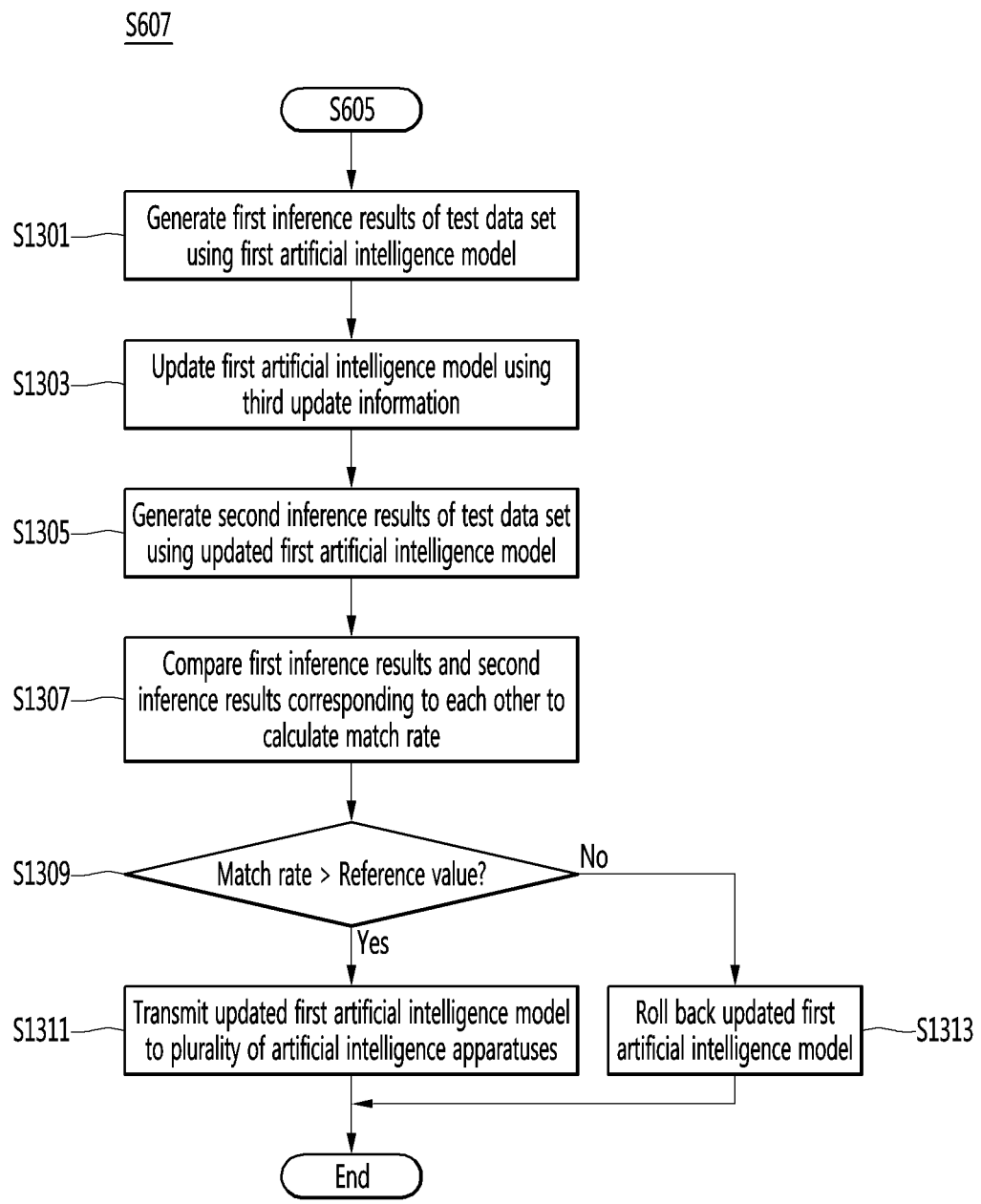

US 11,669,781 B2

ARTIFICIAL INTELLIGENCE SERVER AND METHOD FOR UPDATING ARTIFICIAL INTELLIGENCE MODEL BY MERGING PLURALITY OF PIECES OF UPDATE INFORMATION

CROSS-REFERENCE TO RELATED APPLICATIONS

Pursuant to 35 U.S.C. § 119(a), this application claims the benefit of earlier filing date and right of priority to Korean Patent Application No. 10-2019-0169162, filed on Dec. 17, 2019, the contents of which are hereby incorporated by reference herein in its entirety.

BACKGROUND

The present disclosure relates to an artificial intelligence server and method for updating an artificial intelligence model by merging a plurality of pieces of update information received from at least one artificial intelligence apparatus.

Recently, many artificial intelligence evolution technologies for continuously updating an artificial intelligence model based on a usage log of a user have been employed. When the artificial intelligence model is updated based on the actual usage log of the user, training data suitable for the actual usage of the user may be obtained, thereby configuring a more realistic and useful artificial intelligence model.

However, if an artificial intelligence apparatus transmits the usage log of the user to an artificial intelligence server without change, a lot of network traffic may occur and user's privacy may be invaded.

SUMMARY

An object of the present disclosure is to provide an artificial intelligence server and method for updating an artificial intelligence model by merging a plurality of pieces of update information received from a plurality of artificial intelligence apparatuses.

Another object of the present disclosure is to provide an artificial intelligence server and method for updating an artificial intelligence model by merging received update information even when a plurality of received update information is asynchronous update information.

According to an embodiment, provided are an artificial intelligence server and method for transmitting a first artificial intelligence model to a plurality of artificial intelligence apparatuses, receiving, from at least one artificial intelligence apparatus, first update information of the first artificial intelligence model or second update information of a second artificial intelligence model updated from the first artificial intelligence model, selecting third update information to be used to update the first artificial intelligence model from the first update information and the second update information, and updating the first artificial intelligence model using the selected third update information.

According to an embodiment, provided are an artificial intelligence server and method for determining an outlier from the received first update information and second update information and selecting, as the third update information, update information excluding the determined outlier.

According to an embodiment, provided are an artificial intelligence server and method for determining the outlier in consideration of a local density score, a local outlier factor (LOF) or a ratio of a distance from an average to the received update information over a standard deviation with respect to each received update information.

According to an embodiment, provided are an artificial intelligence server and method for updating the first artificial intelligence model, by adding a sum, an average or a weighted sum of the third update information to a model parameter set of the first artificial intelligence model.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 9 is a view illustrating a method of updating an artificial intelligence model using asynchronous update information of an artificial intelligence model according to an embodiment of the present disclosure;

FIG. 12 is a view illustrating an example of third update information selected from first update information or second update information;

FIG. 13 is a flowchart illustrating an example of step S607 of updating the first artificial intelligence model shown in FIG. 6;

DETAILED DESCRIPTION OF THE EMBODIMENTS

Figure 1:
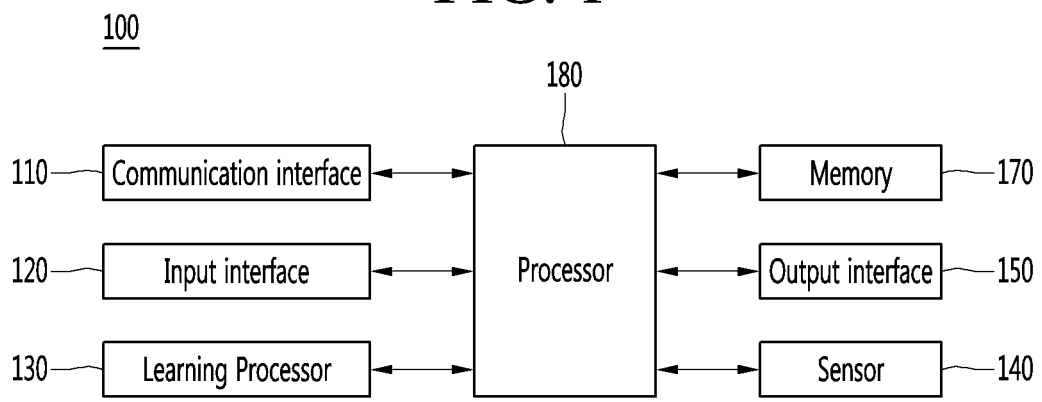
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a traveling actuator including an actuator or a motor and may perform various physical operations such as moving a robot joint. In addition, a movable robot may include a wheel, a brake, a propeller, and the like in a traveling actuator, and may travel on the ground through the traveling actuator or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensor 140, an output interface 150, a memory 170, and a processor 180.

The communication interface 110 may transmit and receive data to and from external devices such as other AI apparatuses 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensor 140 may acquire at least one of internal information about the AI apparatus 100, ambient environment information about the AI apparatus 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
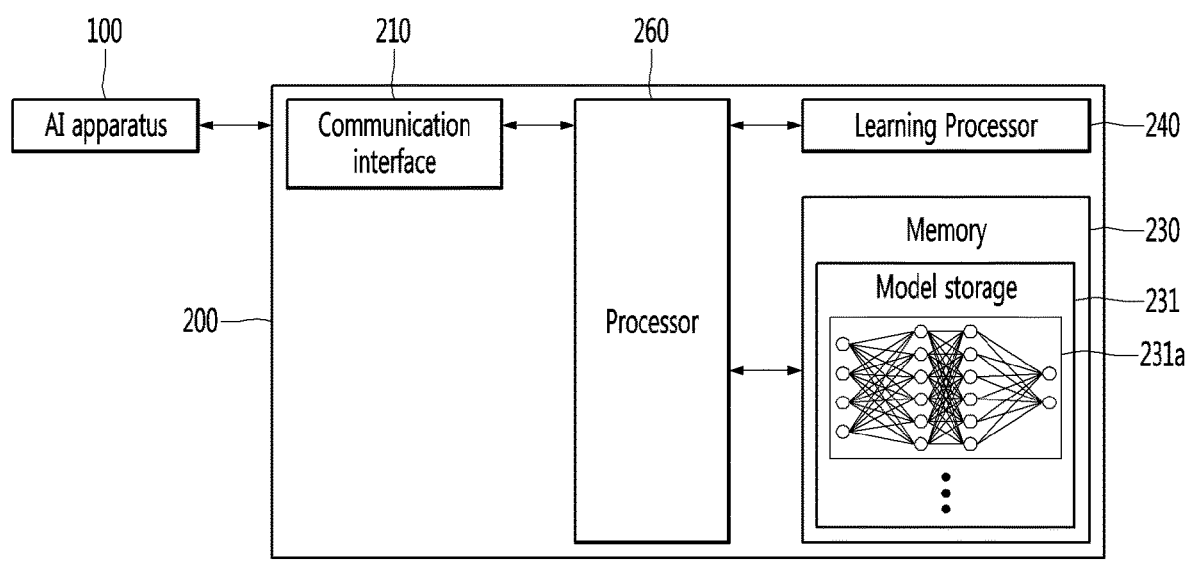
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage 231. The model storage 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
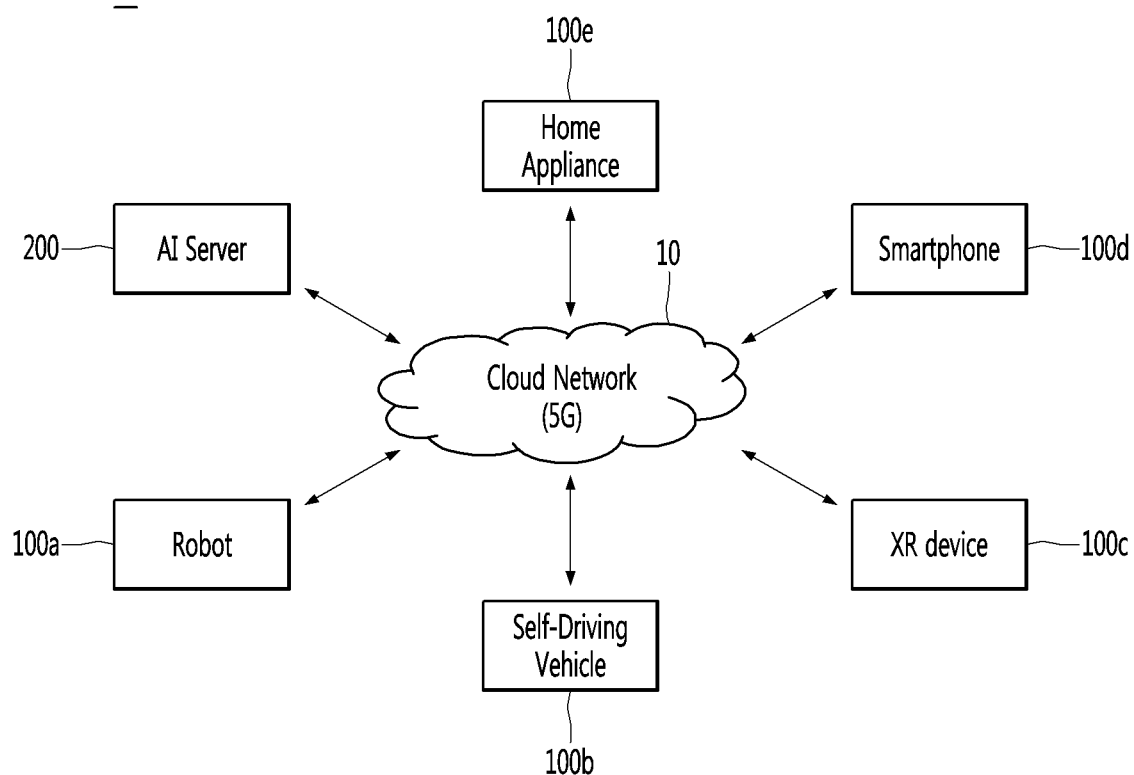
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the apparatuses 100a to 100e and 200 configuring the AI system 1 may be connected to each other through the cloud network 10. In particular, each of the apparatuses 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the traveling actuator such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the traveling actuator based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the traveling actuator such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the traveling actuator based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given route without the user's control or moves for itself by determining the route by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

Here, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the traveling actuator of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
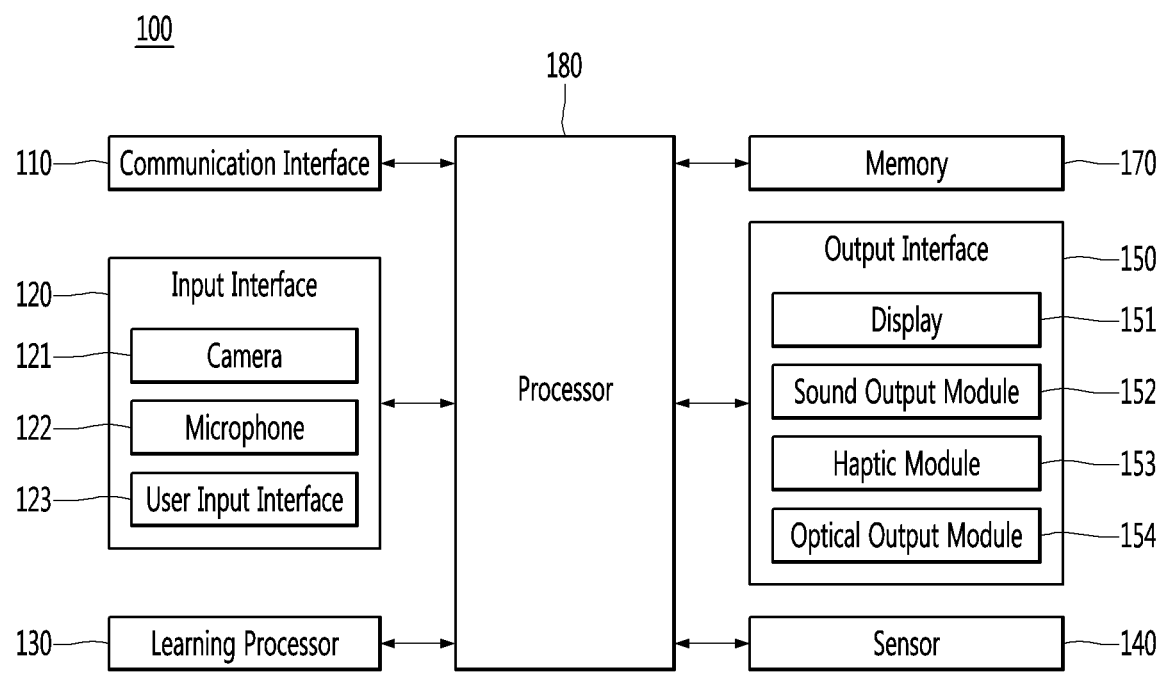
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication interface 110 may also be referred to as a communication modem or a communication circuit.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensor 140 may also be referred to as a sensor module.

The output interface 150 may include at least one of a display 151, a sound output module 152, a haptic module 153, or an optical output module 154.

The display 151 may display (output) information processed in the AI apparatus 100. For example, the display 151 may display execution screen information of an application program running on the AI apparatus 100 or user interface (UI) and graphic user interface (GUI) information according to such execution screen information.

The display 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
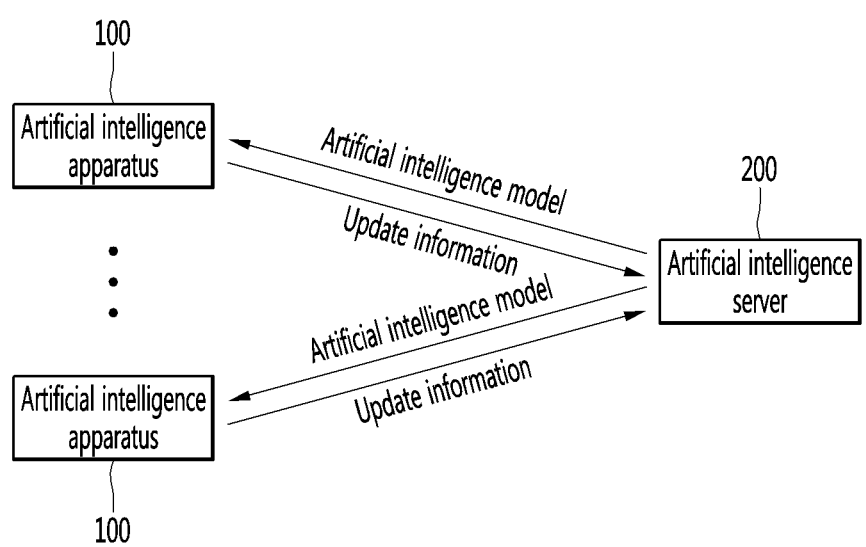
FIG. 5 is a view illustrating an artificial intelligence system for updating an artificial intelligence model by merging a plurality of pieces of update information according to an embodiment of the present disclosure.

FIG. 5 is a view illustrating an artificial intelligence system 1 for updating an artificial intelligence model by merging a plurality of pieces of update information according to an embodiment of the present disclosure.

Referring to FIG. 5, an artificial intelligence system 1 for updating an artificial intelligence model by merging a plurality of pieces of update information may include a plurality of artificial intelligence apparatuses 100 and an artificial intelligence server 200. The plurality of artificial intelligence apparatuses 100 may communicate with the artificial intelligence server 200 via wired/wireless communication.

The artificial intelligence server 200 may transmit an artificial intelligence model to each artificial intelligence apparatus 100, and each artificial intelligence apparatus 100 may perform various operations using the received artificial intelligence model.

Each artificial intelligence apparatus 100 may generate update information of an artificial intelligence model, by generating training data based on a usage log of the artificial intelligence model and updating the artificial intelligence model using the generated training data. In addition, each artificial intelligence apparatus 100 may transmit the generated update information to the artificial intelligence server 200 in place of the generated training data.

The artificial intelligence server 200 may select update information suitable for update of the artificial intelligence model stored in the artificial intelligence server 200 from the update information received from at least one artificial intelligence apparatus 100, and update the artificial intelligence model using the selected update information. Further, the artificial intelligence server 200 may synchronize all the artificial intelligence apparatuses 100 to use the same artificial intelligence model, by transmitting the updated artificial intelligence model to each artificial intelligence apparatus 100.

The embodiments of the present disclosure can effectively reduce network traffic without causing a privacy problem, by transmitting update information of the artificial intelligence model in place of training data generated by the artificial intelligence apparatus 100 to the artificial intelligence server 200. However, since the update information generated by the artificial intelligence apparatuses 100 has different update baselines, the artificial intelligence server 200 may maintain update reliability of the artificial intelligence model, by selecting update information suitable for update of the artificial intelligence model from among the received update information and updating the artificial intelligence model.

Figure 6:
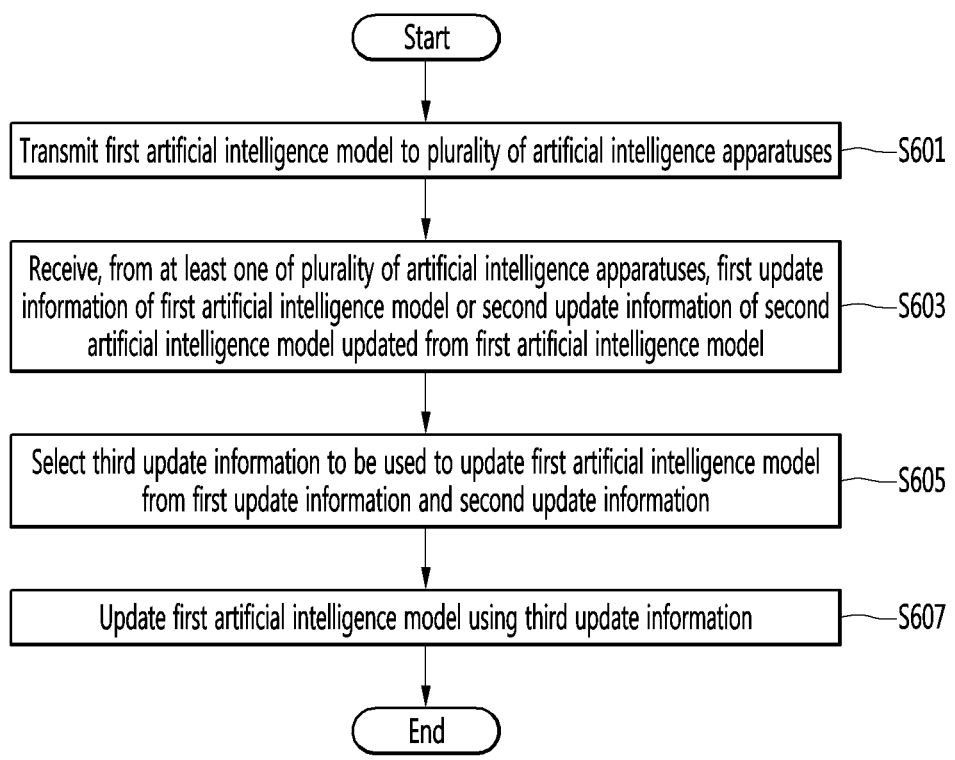
FIG. 6 is a flowchart illustrating an artificial intelligence system for updating an artificial intelligence model by merging a plurality of pieces of update information according to an embodiment of the present disclosure.

FIG. 6 is a flowchart illustrating an artificial intelligence system for updating an artificial intelligence model by merging a plurality of pieces of update information according to an embodiment of the present disclosure.

Referring to FIG. 6, the processor 260 of the artificial intelligence server 200 transmits a first artificial intelligence model to the plurality of artificial intelligence apparatuses 100 via the communication interface 210 (S601).

The processor 260 of the artificial intelligence server 200 may transmit the same first artificial intelligence model to the plurality of artificial intelligence apparatuses 100 via the communication interface 210. The first artificial intelligence model may be stored in the memory 230 of the artificial intelligence server 200 and may mean the artificial intelligence model equally transmitted to each artificial intelligence apparatus 100 to be synchronized. In addition, the first artificial intelligence model may mean the artificial intelligence model to be updated in the artificial intelligence server 200.

The first artificial intelligence model or the artificial intelligence model is used to perform predetermined operation in the artificial intelligence apparatus 100 and may include various models such as a speech recognition model, an object recognition model and a content recommendation model.

In addition, the processor 260 of the artificial intelligence server 200 receives, from at least some of the plurality of artificial intelligence apparatuses 100, first update information of the first artificial intelligence model or second update information of a second artificial intelligence model updated from the first artificial intelligence model via the communication interface 210 (S603).

The artificial intelligence apparatus 100 may perform various operations using the first artificial intelligence model received from the artificial intelligence server 200, and generate first training data for updating the first artificial intelligence model based on an operation performance log. In addition, the artificial intelligence apparatus 100 may update the first artificial intelligence model using the first training data, and generate the first update information of the first artificial intelligence model. The first training data may mean training data for updating the first artificial intelligence model. The first update information may mean the update information of the first artificial intelligence model.

The update information of the artificial intelligence model may mean an update amount of a model parameter set configuring the artificial intelligence model. Hereinafter, the term "model parameter" may be used interchangeably with the term "model parameter set".

Also, the artificial intelligence apparatus 100 may perform various operations using the second artificial intelligence model updated from the first artificial intelligence model, and generate second training data for updating the second artificial intelligence model based on an operation performance log. In addition, the artificial intelligence apparatus 100 may update the second artificial intelligence model using the second training data, and generate second update information of the second artificial intelligence model. The second training data may mean training data for updating the second artificial intelligence model. The second update information may mean the update information of the second artificial intelligence model. In particular, the second artificial intelligence model may mean the artificial intelligence model updated from the first artificial intelligence model in the artificial intelligence apparatus 100, and not only the artificial intelligence model updated from the first artificial intelligence model but also the artificial intelligence model updated from the second artificial intelligence model may be still referred to as the second artificial intelligence model.

The artificial intelligence apparatus 100 may transmit, to the artificial intelligence server 200, the first update information or the second update information via the communication interface 110. However, the update information transmitted from the artificial intelligence apparatus 100 may or may not include information for identifying whether the update information is the first update information or the second update information.

In addition, the processor 260 of the artificial intelligence server 200 selects a third update information to be used to update the first artificial intelligence model from the first update information and the second update information (S605).

The third update information may mean update information used to update, by the artificial intelligence server 200, the first artificial intelligence model selected from the first update information and the second update information received from at least one artificial intelligence apparatus 100. Accordingly, the third update information may include the first update information of the first artificial intelligence model and the second update information of the second artificial intelligence model, and is used to update the first artificial intelligence model stored in the memory 230 of the artificial intelligence server 200.

The artificial intelligence model which is the update baseline of the first update information is the first artificial intelligence model, and is same as the first artificial intelligence model stored in the memory 230 of the artificial intelligence server 200. Accordingly, although the first update information received by the plurality of artificial intelligence apparatuses 100 is generated based on different first training data, the update baseline thereof is the first artificial intelligence model and is the same. In contrast, since the second update information is update information used to update the second artificial intelligence model updated from the first artificial intelligence model, the update baselines of not only the plurality of pieces of second update information generated in different artificial intelligence apparatuses 100 but also the plurality of pieces of second update information generated in the same artificial intelligence apparatus 100 may be different.

However, even if the update baselines of the update information are different from each other, since the artificial intelligence model needs to be updated in a similar direction, the update information should not be extremely different from each other. Accordingly, the artificial intelligence server 200 may select only similar third update information from the received first update information and second update information. In one embodiment, the processor 260 may extract an outlier from the received first update information and second update information, and select, as the third update information, update information excluding the outlier extracted from the received first update information and second update information.

The processor 260 may receive the first update information or the second update information for a predetermined period, and select the third update information from the received update information. For example, the processor 260 may receive, from the artificial intelligence apparatus 100, the first update information or the second update information for 24 hours, and select the third update information to be used to update the first artificial intelligence model from the first update information or second update information received for 24 hours.

The processor 260 may receive a predetermined number of pieces of first update information or the second update information, and select the third update information from the received update information. For example, the processor 260 may receive the first update information or the second update information until the number of update information received from the artificial intelligence apparatus 100 becomes 50, and select the third update information to be used to update the first artificial intelligence model from the received 50 first update information or second update information. One update information may mean update information generated from one training data and one training data may mean training data generated from one usage log.

In addition, the processor 260 of the artificial intelligence server 200 updates the first artificial intelligence model stored in the memory 230 using the third update information (S607).

The processor 260 may update the first artificial intelligence model directly or using the learning processor 240. Since the first update information and the second update information received from the artificial intelligence apparatus 100 includes the update amount of the model parameter of the artificial intelligence model, not the training data, the update of the first artificial intelligence model using the third update information does not mean the update of the model parameter using the training data but means the update of the model parameter using the update amount of the received model parameter. Accordingly, the update of the first artificial intelligence model using the third update information is performed with fewer operations as compared to the update of the artificial intelligence model using the training data.

The processor 260 may update the model parameter of the first artificial intelligence model based on the sum, average or weighted sum of the selected third update information. Specifically, the processor 260 may calculate the sum, average or weighted sum of the update amount of the model parameter included in the selected third update information, and update the model parameter of the artificial intelligence model using the calculated value. In particular, the processor 260 may set the weight of the weighted sum higher as the generation or reception time of the third update information is late (that is, with respect to the latest update information), when weighted-summing the third update information.

Thereafter, the processor 260 of the artificial intelligence server 200 may transmit the updated first artificial intelligence model to each artificial intelligence apparatus 100 via the communication interface 210, thereby synchronizing the artificial intelligence model to be installed in each artificial intelligence apparatus 100.

In the artificial intelligence server and method for updating the artificial intelligence model by merging the plurality of pieces of update information according to the embodiments of the present disclosure, since the artificial intelligence server receives the update information from the plurality of artificial intelligence apparatuses and updates the artificial intelligence model, the artificial intelligence model may be regarded as being updated via federated learning.

The steps shown in FIG. 6 may be repeatedly performed and thus the artificial intelligence apparatus 100 may repeatedly generate training data to be used to update the artificial intelligence model from input data and feedback.

The order of the steps shown in FIG. 6 is merely an example and the present disclosure is not limited thereto. That is, in one embodiment, the order of some of the steps shown in FIG. 6 may be reversed. In addition, in one embodiment, some of the steps shown in FIG. 6 will be performed in parallel.

Figure 7:
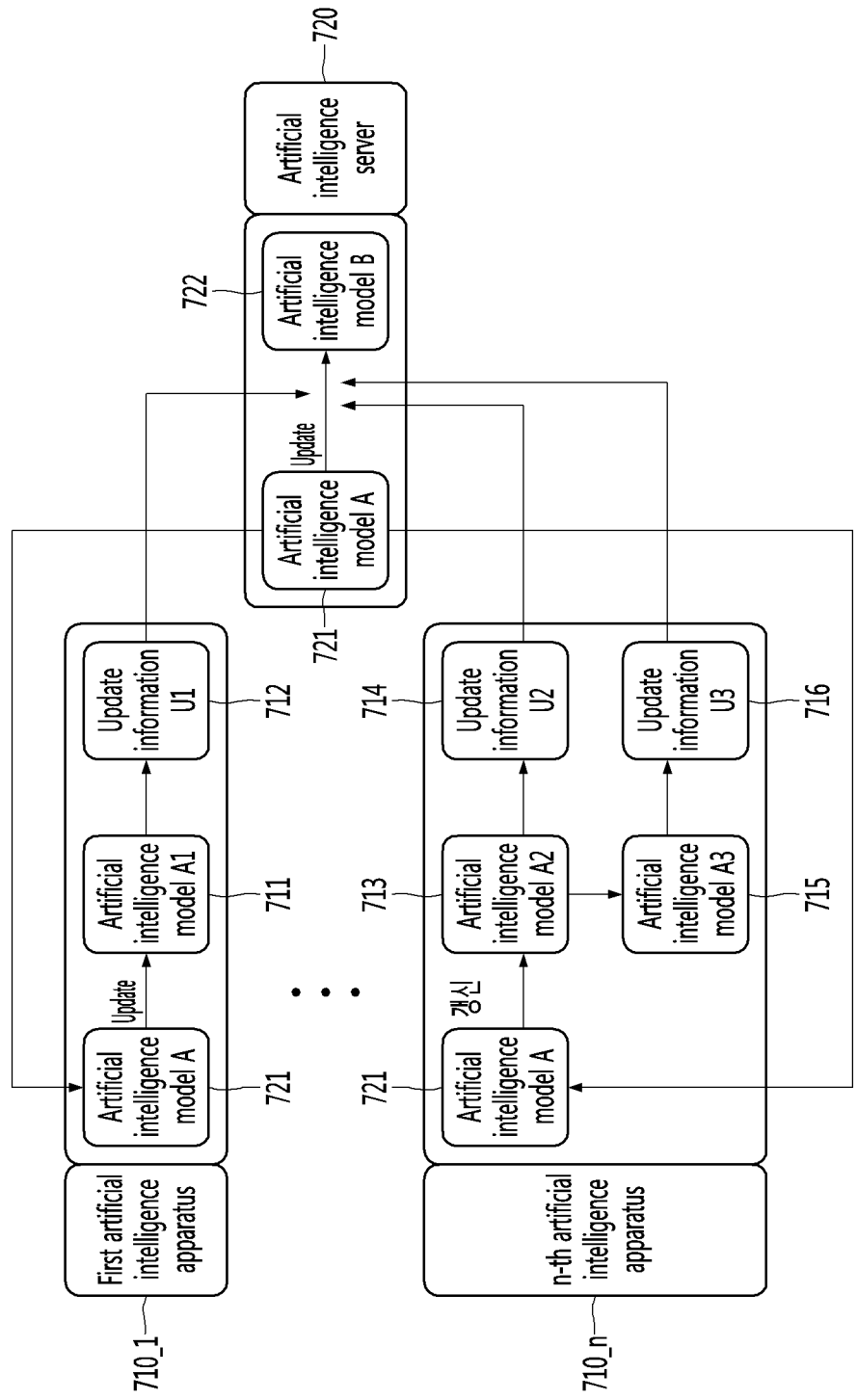
FIG. 7 is a view illustrating an artificial intelligence system for updating an artificial intelligence model by merging a plurality of pieces of update information according to an embodiment of the present disclosure.

FIG. 7 is a view illustrating an artificial intelligence system 1 for updating an artificial intelligence model by merging a plurality of pieces of update information according to an embodiment of the present disclosure.

Referring to FIG. 7, an artificial intelligence system 1 for updating an artificial intelligence model by merging a plurality of pieces of update information may include a first artificial intelligence apparatus 710_1 to an n-th artificial intelligence apparatus 710_n and an artificial intelligence server 720. The artificial intelligence apparatuses 710_1 to 710_n may function as edge devices. The artificial intelligence server 720 may be configured as a cloud server.

The artificial intelligence server 720 may transmit, to the artificial intelligence apparatuses 710_1 to 710_n, the same artificial intelligence model A 721. The artificial intelligence model A 721 is an artificial intelligence model to be updated in the artificial intelligence server 720 and belongs to the above-described first artificial intelligence model.

The first artificial intelligence apparatus 710_1 may update the artificial intelligence model A 721 to an artificial intelligence model A1 711 based on a usage long using the received artificial intelligence model A 721, and generate update information U1 712. In addition, the first artificial intelligence apparatus 710_1 may transmit the generated update information U1 712 to the artificial intelligence server 720. The artificial intelligence model A1 711 is the artificial intelligence model updated from the artificial intelligence model A 721 and belongs to the above-described second artificial intelligence model. The update information U1 712 is a difference between the model parameter set of the artificial intelligence model A1 711 and the model parameter set of the artificial intelligence model A 721 and may be expressed by A1-A.

The n-th artificial intelligence apparatus 710_n may update the artificial intelligence model A 721 to an artificial intelligence model A2 713 based on a usage log using the received artificial intelligence model A 721, and generate update information U2 714. In addition, the n-th artificial intelligence apparatus 710_n may update the artificial intelligence model A2 713 to an artificial intelligence model A3 715 based on a usage log using the updated artificial intelligence model A2 713, and generate update information U3 716. In addition, the n-th artificial intelligence apparatus 710_n may transmit the generated update information U2 714 and update information U3 716 to the artificial intelligence server 720. The artificial intelligence model A2 713 and the artificial intelligence model A3 715 are the artificial intelligence models updated from the artificial intelligence model A 721, and belong to the above-described second artificial intelligence model. The update information U2 714 is a difference between the model parameter set of the artificial intelligence model A2 713 and the model parameter set of the artificial intelligence model A 721, and may be expressed by A2-A. Similarly, the update information U3 716 is a difference between the model parameter set of the artificial intelligence model A3 715 and the model parameter set of the artificial intelligence model A2 723, and may be expressed by A3-A2.

The artificial intelligence server 720 may update the artificial intelligence model A 721 to an artificial intelligence model B 722 using at least one of the update information U1 712, the update information U2 714 or the update information U3 716 received from the artificial intelligence apparatuses 710_1 to 710_n.

Although not shown in FIG. 7, the artificial intelligence server 720 may transmit the updated artificial intelligence model B 722 to the artificial intelligence apparatuses 710_1 to 710_n, thereby synchronizing the artificial intelligence models stored in the artificial intelligence apparatuses 710_1 to 710_n. In this case, the artificial intelligence model B 722 transmitted to the artificial intelligence apparatuses 710_1 to 710_n belongs to the above-described first artificial intelligence model.

Figure 8:
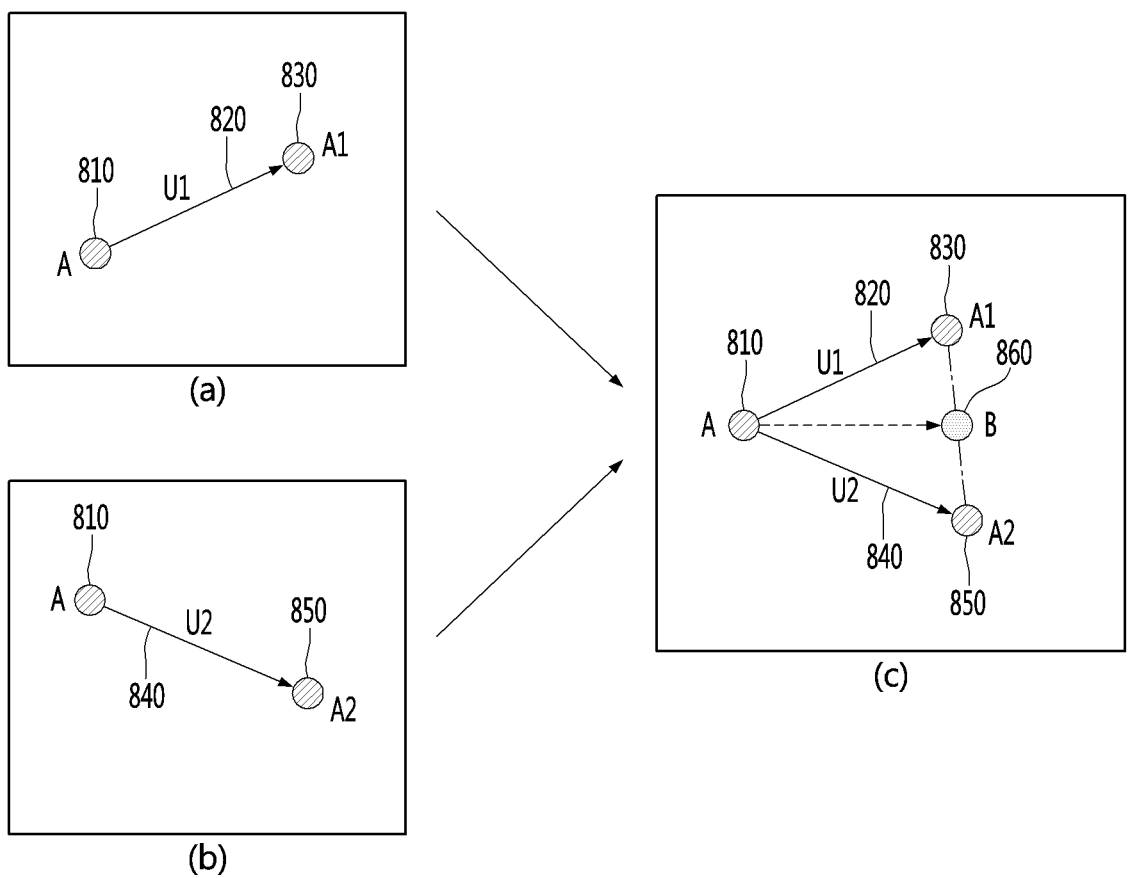
FIG. 8 is a view illustrating a method of updating an artificial intelligence model using synchronous update information of an artificial intelligence model according to an embodiment of the present disclosure.

FIG. 8 is a view illustrating a method of updating an artificial intelligence model using synchronous update information of an artificial intelligence model according to an embodiment of the present disclosure.

Referring to FIG. 8(a), the artificial intelligence apparatus 100 may update an artificial intelligence model A 810 to an artificial intelligence model A1 830, and generate update information U1 820 corresponding thereto. The update information U1 820 is change in model parameter set when the artificial intelligence model A 810 is updated to the artificial intelligence model A1 830 and may be expressed by A1-A.

Referring to FIG. 8(b), the artificial intelligence apparatus 100 may update the artificial intelligence model A 810 to an artificial intelligence model A2 850, and generate the update information U2 840 corresponding thereto. The update information U2 840 is change in model parameter set when the artificial intelligence model A 810 is updated to the artificial intelligence model A2 850 and may be expressed by A2-A.

The above-described update information U1 820 and update information U2 840 may be generated in the artificial intelligence apparatus 100, and the generated update information U1 820 and update information U2 840 may be transmitted to the artificial intelligence server 200 and used to update the artificial intelligence model A 810. Here, the update information U1 820 and the update information U2 840 may be generated in the same artificial intelligence apparatus 100 or different artificial intelligence apparatuses 100.

Referring to FIG. 8(c), if it is assumed that the artificial intelligence server 200 selects the update information U1 820 and the update information U2 840 as the update information (or the third update information) to be used to update the artificial intelligence model A 810, the artificial intelligence server 200 may update the artificial intelligence model A 810 using the update information U1 820 and the update information U2 840 received from the artificial intelligence apparatus 100.

In one embodiment, the artificial intelligence server 200 may update the artificial intelligence model A 810 to an artificial intelligence model B 860 based on the average of the received update information U1 820 and update information U2 840. In another embodiment, unlike FIG. 8(c), the artificial intelligence server 200 may update the artificial intelligence model A 810 based on the sum or weighted sum of the received update information U1 820 and update information U2 840.

FIG. 9 is a view illustrating a method of updating an artificial intelligence model using asynchronous update information of an artificial intelligence model according to an embodiment of the present disclosure.

Referring to FIG. 9(a), the artificial intelligence apparatus 100 may update an artificial intelligence model A 910 to an artificial intelligence model A1 930 and generate update information U1 920 corresponding thereto. The update information U1 920 is change in model parameter set when the artificial intelligence model A 910 is updated to the artificial intelligence model A1 930 and may be expressed by A1-A.

Referring to FIG. 9(b), the artificial intelligence apparatus 100 may update an artificial intelligence model A' 940 to an artificial intelligence model A2 960, and generate update information U2 950 corresponding thereto. The update information U2 950 is change in model parameter set when the artificial intelligence model A' 940 is updated to the artificial intelligence model A2 960 and may be expressed by A2-A'. The artificial intelligence model A' 940 is a model updated from the artificial intelligence model A 910 at least once and may not be equal to the artificial intelligence model A 910.

The above-described update information U1 920 and update information U2 950 may be generated in the artificial intelligence apparatus 100, and the generated update information U1 920 and update information U2 950 may be transmitted to the artificial intelligence server 200 and used to update the artificial intelligence model A 910. Here, the update information U1 920 and the update information U2 950 may be generated in the same artificial intelligence apparatus 100 or different artificial intelligence apparatuses 100.

Referring to FIG. 9(c), if it is assumed that the artificial intelligence server 200 selects the update information U1 920 and the update information U2 950 as the update information (or the third update information) to be used to update the artificial intelligence model A 910, the artificial intelligence server 200 may update the artificial intelligence model A 910 using the update information U1 920 and the update information U2 950 received from the artificial intelligence apparatus 100. Although the update baseline of the update information U2 950 is the artificial intelligence model A' 940 and is not the artificial intelligence model A 910, the artificial intelligence server 200 may set the update baseline to the artificial intelligence model A 910 to perform update. When the artificial intelligence model A 910 is updated using the update information U2 950, the artificial intelligence model A 910 may be updated to an artificial intelligence model A3 970.

In one embodiment, the artificial intelligence server 200 may update the artificial intelligence model A 910 to an artificial intelligence model B 980 based on the average of the received update information U1 920 and update information U2 950. In another embodiment, unlike FIG. 9(c), the artificial intelligence server 200 may update the artificial intelligence model A 910 based on the sum or weighted sum of the received update information U1 920 and update information U2 950.

As shown in FIG. 9(c), the method of updating the artificial intelligence model using asynchronous update information may have lower performance of the updated artificial intelligence model than the method of updating the artificial intelligence model using synchronous update information. However, if the method of updating the artificial intelligence model using only synchronous update information is employed, since only the update information having the same update baseline is collected, update efficiency is lowered. Accordingly, in this disclosure, even if the update baseline is different, by selecting the update information which does not significantly lower performance of the artificial intelligence model and updating the artificial intelligence model, it is possible to efficiently update the artificial intelligence model.

Figure 10:
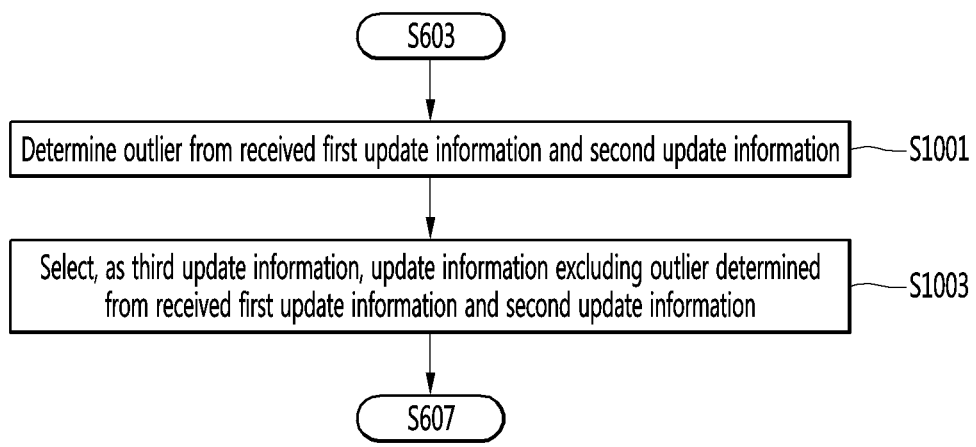
FIG. 10 is a flowchart illustrating an example of step S605 of selecting third update information shown in FIG. 6.

FIG. 10 is a flowchart illustrating an example of step S605 of selecting third update information shown in FIG. 6.

Referring to FIG. 10, the processor 260 of the artificial intelligence server 200 determines an outlier from the received first update information and second update information (S1001).

The processor 260 may determine the outlier from the received first update information and second update information using various outlier determination methods.

In one embodiment, the processor 260 may calculate a local density score with respect to each update information based on a distance between the received first update information and second update information, and determine update information, the calculated local density score of which is less than a reference value, as an outlier. For example, the processor 180 may calculate the number of pieces of update information included within a predetermined distance from each update information as a local density score or calculate an average of distances to a predetermined number of pieces of update information adjacent to each update information as a local density score.

In one embodiment, the processor 260 may calculate a local outlier factor (LOF) with respect to each update information using a local outlier factor algorithm, and determine update information, the calculated local outlier factor of which is greater than a reference value, as an outlier. The LOF algorithm has an advantage that both local and global features of a data set may be considered.

In one embodiment, the processor 260 may calculate an average and standard deviation (or variance) for the received first update information and second update information, calculate a ratio of a distance from the calculated average to each update information over the calculated standard deviation (or variance), and determine update information, the calculated ratio of which is greater than a reference value, as an outlier.

In addition, the processor 260 of the artificial intelligence server 200 selects, as third update information, the update information excluding the outlier determined from the received first update information and second update information (S1003).

The steps shown in FIG. 10 may be performed in parallel.

Figure 11:
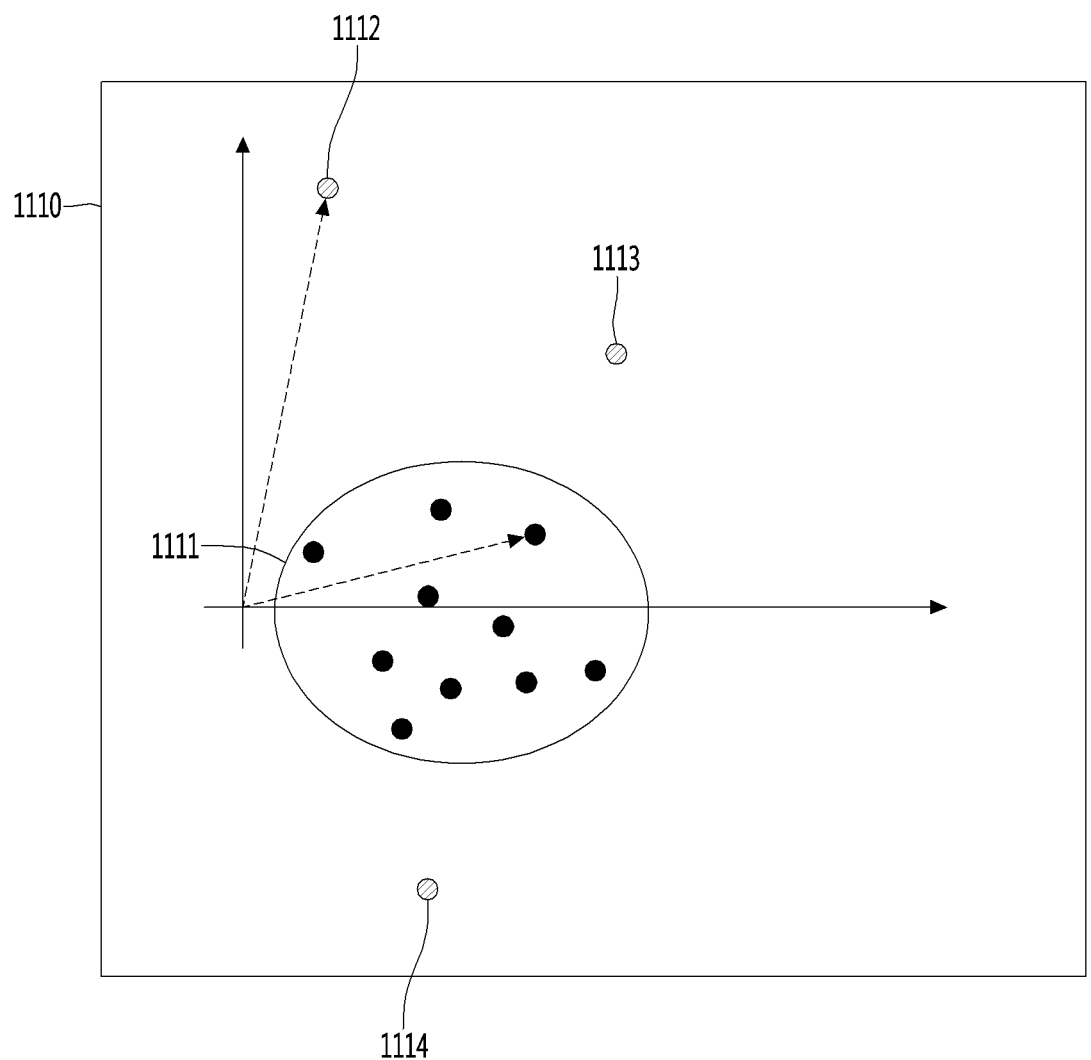
FIG. 11 is a view illustrating a method of selecting third update information according to an embodiment of the present disclosure.

FIG. 11 is a view illustrating a method of selecting third update information according to an embodiment of the present disclosure.

Referring to FIG. 11, the artificial intelligence server 200 may receive, from at least one artificial intelligence apparatus 100, the first update information or the second update information, and the received update information may include change in model parameter set of the artificial intelligence model. Accordingly, each update information may be represented by mapping to a model parameter space 1110. Each axis of the model parameter space 1110 may correspond to the model parameter of the first artificial intelligence model. However, FIG. 11 two-dimensionally shows the model parameter space 1110 for the purpose of visualization and the present disclosure is not limited thereto.

The update information mapped to the model parameter space 1110 may be represented by a vector or a point with respect to the origin. In particular, if it is assumed that the origin of the model parameter space 1110 is the first artificial intelligence model, the mapped update information may indicate the artificial intelligence model updated from the first artificial intelligence model using the update information. That is, the update information may be treated equivalently to the updated artificial intelligence model.

In FIG. 11, a total of 13 pieces of update information is mapped to the model parameter space. The artificial intelligence server 200 may determine the outlier from the received update information using various outlier determination methods. Ten of the 13 pieces of update information may be adjacent to each other to form one cluster 1111. In contrast, three pieces of update information 1112, 1113 and 1114, which are not included in the cluster 1111, among the 13 pieces of update information are far from the other update information and have a low local density. Accordingly, the artificial intelligence server 200 may determine three pieces of update information 1112, 1113 and 1114 as the outlier and select ten pieces of update information excluding the outlier among the 13 pieces of update information as the third update information.

When the plurality of pieces of update information is received and the artificial intelligence model is updated using only the update information excluding the outlier among the plurality of pieces of update information, the artificial intelligence model may be updated based on much update information as possible, and a waiting time for updating the artificial intelligence model may be short.

FIG. 12 is a view illustrating an example of third update information selected from first update information or second update information.

Prior to the description, assume that an artificial intelligence model A is a first artificial intelligence model which is a model to be updated in the artificial intelligence server 200, and an artificial intelligence model A' and an artificial intelligence model A" are second artificial intelligence models updated from the first artificial intelligence model. The artificial intelligence model A" may be directly updated from the artificial intelligence model A or from the artificial intelligence model A'.

Referring to FIG. 12, since an update baseline 1221 of update information U1 1211 and update information U2 1212 are the artificial intelligence model A as the first artificial intelligence model, and thus update information U1 1211 and update information U2 1212 belong to the first update information. In contrast, since the update baseline 1221 of update information U3 1213, update information U4 1214 and update information U5 1215 are the artificial intelligence model A' or the artificial intelligence model A" as the second artificial intelligence model, and thus update information U3 1213, update information U4 1214 and update information U5 1215 belong to the second update information. However, the update information 1211 to 1215 received by the artificial intelligence server 200 may not include information on the update baseline 1221.

The update information 1211 to 1215 may include update amounts 1231, 1232, 1233 and 1234 of the update parameter set of the artificial intelligence model, and may be represented by (Model Parameter 1, Model Parameter 2, Model Parameter 3, Model Parameter 4).

In the example of FIG. 12, the update amount of the model parameter set of the update information U1 1211 is (+0.0312, +0.0245, −0.1531, +0.0002), the update amount of the model parameter set of the update information U2 1212 is (+0.0254, +0.0339, −0.1210, −0.0110), the update amount of the model parameter set of the update information U3 1213 is (+0.0152, +0.0294, −0.1151, +0.0127), the update amount of the model parameter set of the update information U4 1214) is (−0.1094, +0.1512, +0.0651, −0.0564), and the update amount of the model parameter set of the update information U5 1215 is (+0.2521, −0.0842, −0.1421, +0.1462). The update information U1 1211, the update information U2 1212 and the update information U3 1213 include similar model parameter set update amounts, but the update information U4 1214 and the update information U5 1215 include different model parameter set update amounts as compared to the other update information. Accordingly, the artificial intelligence server 200 may determine the update information U4 1214 and the update information U5 1215 as an outlier 1241, and select the update information U1 1211, the update information U2 1212 and the update information U3 1213 as the third update information.

FIG. 13 is a flowchart illustrating an example of step S607 of updating the first artificial intelligence model shown in FIG. 6.

Referring to FIG. 13, the processor 260 of the artificial intelligence server 200 generates first inference results of a test data set using the first artificial intelligence model (S1301).

The test data set may refer to a data set predetermined to evaluate the performance of the first artificial intelligence model, and include a plurality of test data. If the test data set includes 100 test data, the processor 260 may generate 100 first inference results corresponding to the test data set using the first artificial intelligence model.

In addition, the processor 260 of the artificial intelligence server 200 updates the first artificial intelligence model using the third update information (S1303).

In this process, the processor 260 may temporarily store the first artificial intelligence model in the memory 230. The first artificial intelligence model temporarily stored in the memory 230 may be used to roll back update of the first artificial intelligence model, upon determining that the updated first artificial intelligence model is inappropriate.

In addition, the processor 260 of the artificial intelligence server 200 generates second inference results of the test data set using the updated first artificial intelligence model (S1305).

If the test data set includes 100 test data, the processor 260 may generate 100 second inference results corresponding to the test data set using the first artificial intelligence model updated using the third update information.

In addition, the processor 260 of the artificial intelligence server 200 compares the first inference results and the second inference results corresponding to each other to calculate a match rate (S1307).

The processor 260 may compare the first inference results with the second inference requests with respect to individual test data included in the test data set, thereby calculating a ratio of the number of inference results matching each other to all inference results as the match rate. If the test data set includes 100 test data, the processor 260 may compare the first inference result of first test data with the second inference result of the first test data and compare the first and second inference results, which correspond to each other, of the remaining 99 test data using a similar method.

In addition, the processor 260 of the artificial intelligence server 200 determines whether the calculated match rate is greater than a reference value (S1309).

If the calculated match rate is greater than the reference value as the result of determination of step S1309, the processor 260 of the artificial intelligence server 200 transmits the updated first artificial intelligence model to the plurality of artificial intelligence apparatuses 100 via the communication interface 210 (S1311).

If the match rate of the first inference result of the test data using the first artificial intelligence model before update and the second inference result of the test data using the first artificial intelligence model after update is high, the processor 260 may determine update of the first artificial intelligence model using the third update information as appropriate update. Accordingly, the processor 260 may delete the first artificial intelligence model temporarily stored in the memory 230 and transmit, to the plurality of artificial intelligence apparatuses 100, the updated first artificial intelligence model via the communication interface 210.

If the calculated match rate is equal to or less than the reference value as the result of determination of step S1309, the processor 260 of the artificial intelligence server 200 rolls back the updated first artificial intelligence model (S1313).

If the match rate of the first inference result of the test data using the first artificial intelligence model before update and the second inference result of the test data using the first artificial intelligence model after update is low, the processor 260 may determine update of the first artificial intelligence model using the third update information as inappropriate update which causes excessive change. Accordingly, the processor 260 may roll back the updated first artificial intelligence model to the first artificial intelligence model temporarily stored in the memory 230.

The order of the steps shown in FIG. 13 is merely an example and the present disclosure is not limited thereto. That is, in one embodiment, the order of some of the steps shown in FIG. 13 may be reversed. In addition, in one embodiment, some of the steps shown in FIG. 13 will be performed in parallel.

Figure 14:
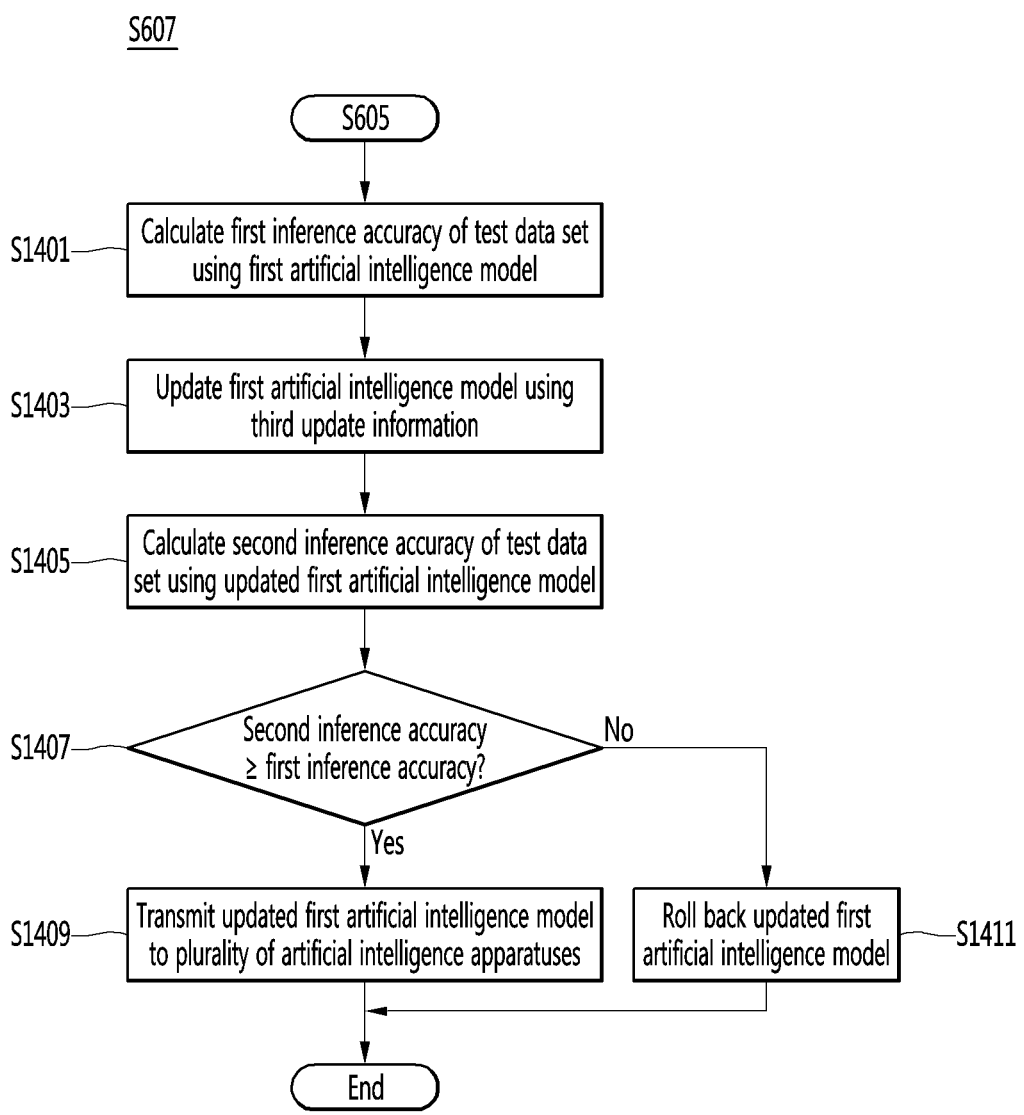
FIG. 14 is a flowchart illustrating an example of step S607 of updating the first artificial intelligence model shown in FIG. 6.

FIG. 14 is a flowchart illustrating an example of step S607 of updating the first artificial intelligence model shown in FIG. 6.

Referring to FIG. 14, the processor 260 of the artificial intelligence server 200 calculates first inference accuracy of the test data set using the first artificial intelligence model (S1401).

The test data set may refer to a data set predetermined to evaluate the performance of the first artificial intelligence model, and include a plurality of test data. If the test data set includes 100 test data, the processor 260 may generate 100 first inference results corresponding to the test data set using the first artificial intelligence model, and calculate first inference accuracy based on the number of inference results accurately inferred with respect to the first inference results.

In addition, the processor 260 of the artificial intelligence server 200 updates the first artificial intelligence model using the third update information (S1403).

In this process, the processor 260 may temporarily store the first artificial intelligence model in the memory 230. The first artificial intelligence model temporarily stored in the memory 230 may be used to roll back update of the first artificial intelligence model upon determining that the updated first artificial intelligence model is inappropriate.

In addition, the processor 260 of the artificial intelligence server 200 calculates second inference accuracy of the test data set using the updated first artificial intelligence model (S1405).

If the test data set includes 100 test data, the processor 260 may generate 100 second inference results corresponding to the test data set using the first artificial intelligence model updated using the third update information, and calculate second inference accuracy based on the number of inference results accurately inferred with respect to the generated second inference results.

In addition, the processor 260 of the artificial intelligence server 200 determines whether the second inference accuracy is equal to or greater than the first inference accuracy (S1407).

That is, the processor 260 may determine whether or not the inference accuracy of the test data set is reduced by updating the first artificial intelligence model using the third update information.

If the second inference accuracy is equal to or greater than the first inference accuracy as the result of determination of step S1407, the processor 260 of the artificial intelligence server 200 transmits the updated first artificial intelligence model to the plurality of artificial intelligence apparatuses 100 via the communication interface 210 (S1409).

If the second inference accuracy of the test data using the first artificial intelligence model after update is equal to or greater than the first inference accuracy of the test data using the first artificial intelligence model before update, the processor 260 may determine update of the first artificial intelligence model using the third update information as appropriate update. Accordingly, the processor 260 may delete the first artificial intelligence model temporarily stored in the memory 230 and transmit the updated first artificial intelligence model to the plurality of artificial intelligence apparatuses 100 via the communication interface 210.

If the second inference accuracy is less than the first inference accuracy as the result of determination of step S1407, the processor 260 of the artificial intelligence server 200 rolls back the updated first artificial intelligence model (S1411).

If the second inference accuracy of the test data using the first artificial intelligence model after update is less than the first inference accuracy of the test data using the first artificial intelligence model before update, the processor 260 may determine update of the first artificial intelligence model using the third update information as inappropriate update causing performance deterioration. Accordingly, the processor 260 may roll back the updated first artificial intelligence model to the first artificial intelligence model temporarily stored in the memory 230.

The order of the steps shown in FIG. 14 is merely an example and the present disclosure is not limited thereto. That is, in one embodiment, the order of some of the steps shown in FIG. 14 may be reversed. In addition, in one embodiment, some of the steps shown in FIG. 14 will be performed in parallel.

Figure 15:
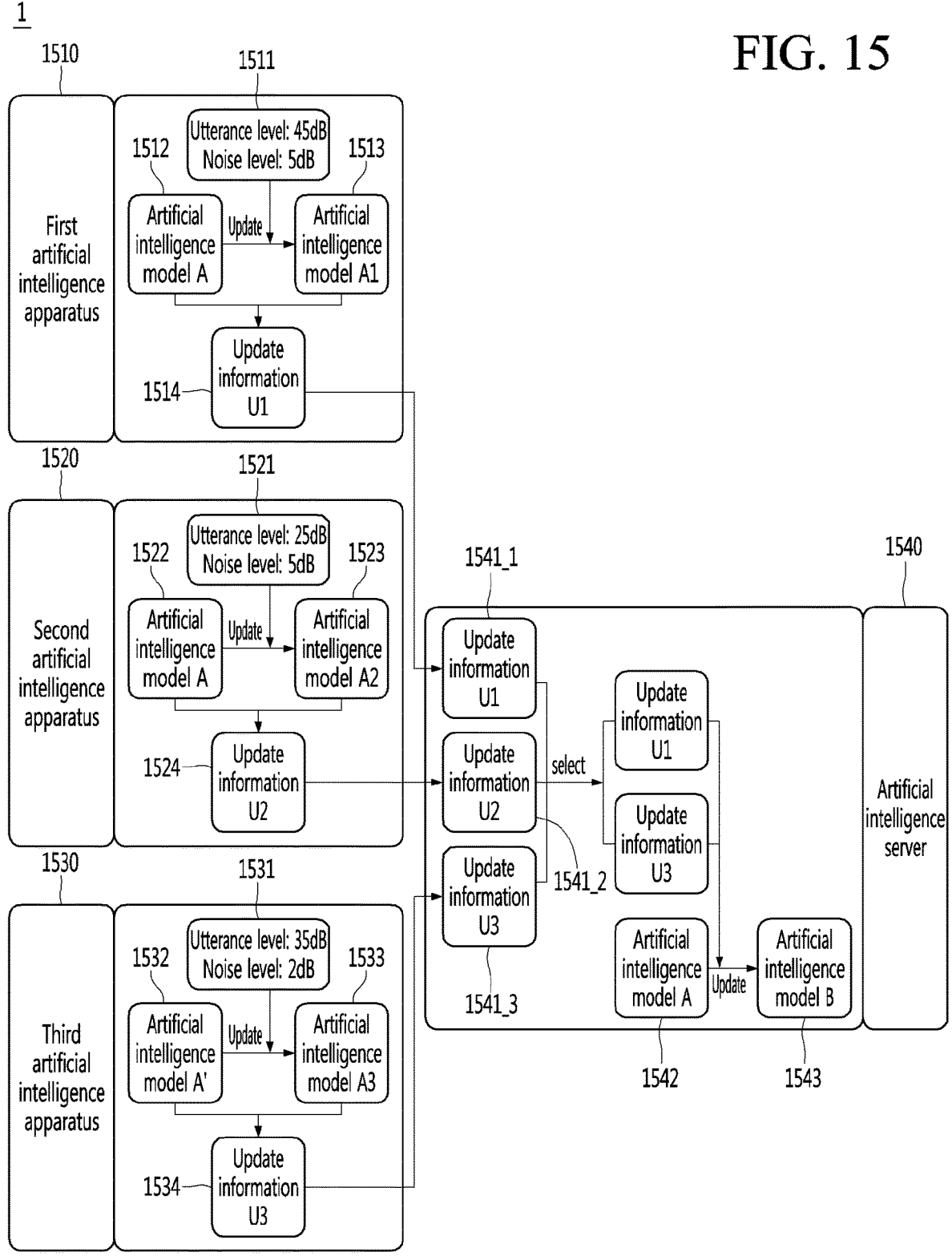
FIG. 15 is a view illustrating an embodiment of the present disclosure.

FIG. 15 is a view illustrating an embodiment of the present disclosure.

Referring to FIG. 15, the artificial intelligence system 1 for updating the artificial intelligence model by merging the plurality of pieces of update information according to the embodiment of the present disclosure may include a first artificial intelligence apparatus 1510, a second artificial intelligence apparatus 1520, a third artificial intelligence apparatus 1530 and an artificial intelligence server 1540.

Each of the artificial intelligence apparatuses 1510, 1520 and 1530 may receive and use an artificial intelligence model A 1542 from the artificial intelligence server 1540. The artificial intelligence model A 1542 may be a speech recognition model.

The first artificial intelligence apparatus 1510 may update the artificial intelligence model A 1512 to an artificial intelligence model A1 1513 using a first usage log 1511 including speech data having an average utterance level of 45 dB and an average noise level of 5 dB and feedback corresponding thereto. In addition, the first artificial intelligence apparatus 1510 may generate and transmit, to the artificial intelligence server 1540, update information U1 1514 for updating the artificial intelligence model A 1512 to the artificial intelligence model A1 1513. The artificial intelligence model A 1512 of the first artificial intelligence apparatus 1510 may be the same model as an artificial intelligence model A 1542 received from the artificial intelligence server 1540.

The second artificial intelligence apparatus 1520 may update an artificial intelligence model A 1522 to an artificial intelligence model A2 1523 using a second usage log 1521 including speech data having an average utterance level of 25 dB and an average noise level of 5 dB and feedback corresponding thereto. In addition, the second artificial intelligence apparatus 1520 may generate and transmit, to the artificial intelligence server 1540, update information U2 1524 for updating the artificial intelligence model A 1522 to the artificial intelligence model A2 1523. The artificial intelligence model A 1522 of the second artificial intelligence apparatus 1520 may be the same model as an artificial intelligence model A 1542 received from the artificial intelligence server 1540.

The third artificial intelligence apparatus 1530 may update an artificial intelligence model A' 1532 to an artificial intelligence model A3 1533 using a third usage log 1531 including speech data having an average utterance level of 35 dB and an average noise level of 2 dB and feedback corresponding thereto. In addition, the third artificial intelligence apparatus 1530 may generate and transmit, to the artificial intelligence server 1540, update information U3 1534 for updating the artificial intelligence model A' 1532 to the artificial intelligence model A3 1533. The artificial intelligence model A' 1532 of the third artificial intelligence apparatus 1530 may be a model updated from the artificial intelligence model A 1542 received from the artificial intelligence server 1540.

The artificial intelligence server 1540 may select update information to be used to update the artificial intelligence model A 1542 from update information U1 1541_1, update information U2 1541_2 and update information U3 1542_3 received from the artificial intelligence apparatus 1510, 1520 and 1530. For example, since the first usage log 1511 has an average utterance level of 45 dB and an average noise level of 5 dB and the third usage log 1532 has an average utterance level of 35 dB and an average noise level of 2 dB, the first usage log 1511 and the third usage log 1532 may be suitably used to improve performance of the artificial intelligence model A 1542 due to the utterance level relatively higher than the noise level. In contrast, since the second usage log 1521 has an average utterance level of 25 dB and an average noise level of 5 dB, the second usage log 1521 may not be suitably used to improve performance of the artificial intelligence model A 1542 due to the utterance level relatively lower than the noise level. Therefore, the artificial intelligence server 1540 may select only the update information U1 1541_1 and the update information U3 1542_3 from the update information U1 1541_1, the update information U2 1541_2 and the update information U3 1542_3 and update the artificial intelligence model A 1542 to the artificial intelligence model B 1543 using the selected update information. In addition, the artificial intelligence server 1540 may transmit the updated artificial intelligence model B 1543 to the artificial intelligence apparatuses 1510, 1520 and 1530.

According to various embodiments of the present disclosure, by receiving only update information of an artificial intelligence model from a plurality of artificial intelligence apparatuses, it is possible to update an artificial intelligence model using the received update information with only a small amount of network traffic without causing a user's privacy problem.

According to various embodiments of the present disclosure, by selecting a plurality of pieces of update information received from a plurality of artificial intelligence apparatuses and updating an artificial intelligence model, it is possible to efficiently update an artificial intelligence model while reducing the side effects of asynchronous update.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence server comprising:
a memory configured to store a first artificial intelligence model;
a communication modem configured to communicate with a plurality of artificial intelligence apparatuses; and
a processor configured to:
transmit, via the communication modem, the first artificial intelligence model to the plurality of artificial intelligence apparatuses;
receive, from at least one of the plurality of artificial intelligence apparatuses, first update information of the first artificial intelligence model or second update information of a second artificial intelligence model generated based on the first artificial intelligence model, the first update information being an update amount of a model parameter set of the first artificial intelligence model, and the second update information being an update amount of a model parameter set of the second artificial intelligence model;
select third update information to be used to update the first artificial intelligence model from among the first update information or the second update information; and
update the first artificial intelligence model using the third update information.

2. The artificial intelligence server of claim 1, wherein the processor is further configured to:
determine an outlier from the first update information and the second update information, and
exclude the determined outlier from the selection of the third update information.

3. The artificial intelligence server of claim 2, wherein determining the outlier comprises:
calculating a local density score of each of the first update information and the second update information; and
determining, as the outlier, update information having a lower calculated local density score than a reference value.

4. The artificial intelligence server of claim 2, wherein determining the outlier comprises:

calculating a local outlier factor (LOF) with respect to each of the first update information and the second update information; and determining, as the outlier, update information having a greater calculated LOF greater than a reference value.

5. The artificial intelligence server of claim 2, wherein determining the outlier comprises:

calculating an average and a standard deviation for the first update information and the second update information;

calculating a ratio of a distance from the calculated average to each of the first update information and the second update information over the calculated standard deviation; and determining, as the outlier, update information having a greater calculated ratio than a reference value.

6. The artificial intelligence server of claim 1, wherein updating the first artificial intelligence model comprises adding a sum of the third update information to the model parameter set of the first artificial intelligence model.

7. The artificial intelligence server of claim 1, wherein updating the first artificial intelligence model comprises adding an average of the third update information to the model parameter set of the first artificial intelligence model.

8. The artificial intelligence server of claim 1, wherein updating the first artificial intelligence model comprises adding a weighted sum of the third update information to the model parameter set of the first artificial intelligence model.

9. The artificial intelligence server of claim 8, wherein the processor is further configured to increase a weight with respect to recent update information when calculating the weighted sum of the third update information.

10. The artificial intelligence server of claim 1, wherein the first update information or the second update information is received for a predetermined period of time after the first artificial intelligence model is transmitted, and wherein the third update information is selected from among the first update information or the second update information when the predetermined period has elapsed.

11. The artificial intelligence server of claim 1, wherein the third update information is selected from among the first update information or the second update information when a predetermined number of pieces of first update information or second update information is received.

12. A method of updating an artificial intelligence model, the method comprising:

transmitting a first artificial intelligence model to a plurality of artificial intelligence apparatuses;

receiving, from at least one of the plurality of artificial intelligence apparatuses, first update information of the first artificial intelligence model or second update information of a second artificial intelligence model generated based on the first artificial intelligence model, the first update information being an update amount of a model parameter set of the first artificial intelligence model, and the second update information being an update amount of a model parameter set of the second artificial intelligence model;

selecting third update information to be used to update the first artificial intelligence model from among the first update information or the second update information; and updating the first artificial intelligence model using the third update information.

13. The method of claim 12 further comprising:

determining an outlier from the first update information and the second update information, and excluding the determined outlier from the selection of the third update information.

14. The method of claim 13, wherein determining the outlier comprises:

calculating a local density score of each of the first update information and the second update information; and determining, as the outlier, update information having a lower calculated local density score than a reference value.

15. The method of claim 13, wherein determining the outlier comprises:

calculating a local outlier factor (LOF) with respect to each of the first update information and the second update information; and determining, as the outlier, update information having a greater calculated LOF greater than a reference value.

16. The method of claim 13, wherein determining the outlier comprises:

calculating an average and a standard deviation for the first update information and the second update information;

calculating a ratio of a distance from the calculated average to each of the first update information and the second update information over the calculated standard deviation; and determining, as the outlier, update information having a greater calculated ratio than a reference value.

17. The method of claim 12, wherein the third update information is selected from among the first update information or the second update information when a predetermined number of pieces of first update information or second update information is received or when a predetermined period of time has elapsed after transmitting the first artificial intelligence model.

18. A non-transitory recording medium having recorded thereon a computer program for controlling a processor to perform a method of updating an artificial intelligence model, the computer program comprising instructions for:

transmitting a first artificial intelligence model to a plurality of artificial intelligence apparatuses;

receiving, from at least one of the plurality of artificial intelligence apparatuses, first update information of the first artificial intelligence model or second update information of a second artificial intelligence model generated based on the first artificial intelligence model, the first update information being an update amount of a model parameter set of the first artificial intelligence model, and the second update information being an update amount of a model parameter set of the second artificial intelligence model;

selecting third update information to be used to update the first artificial intelligence model from among the first update information or the second update information; and updating the first artificial intelligence model using the third update information.

* * * * *